Dec. 18, 1956     C. O. MALMSTRÖM     2,774,494
LIFTING ARRANGEMENT FOR LOADING VEHICLES
Filed Sept. 27, 1954
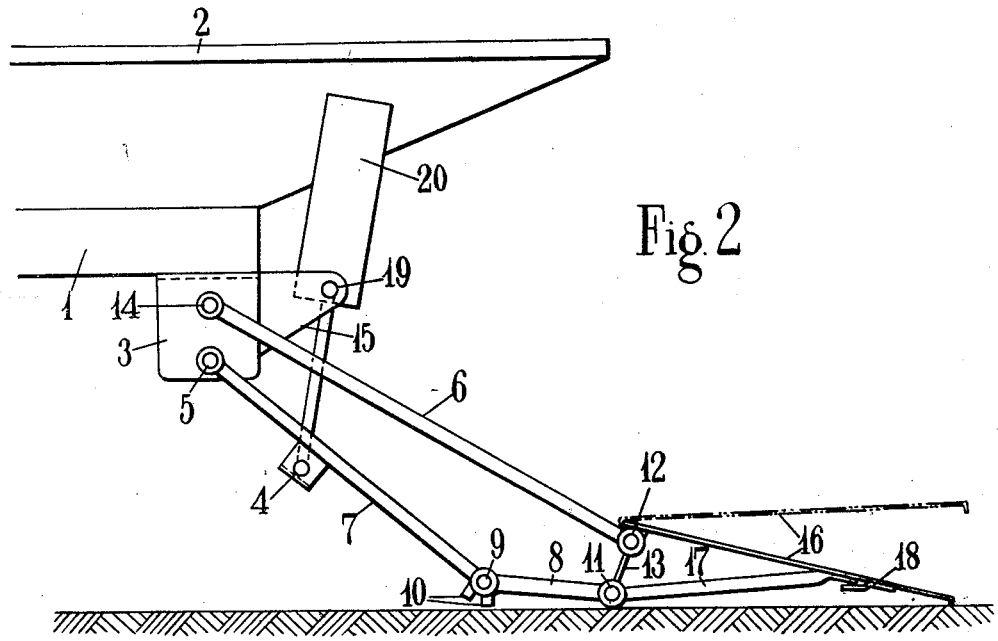
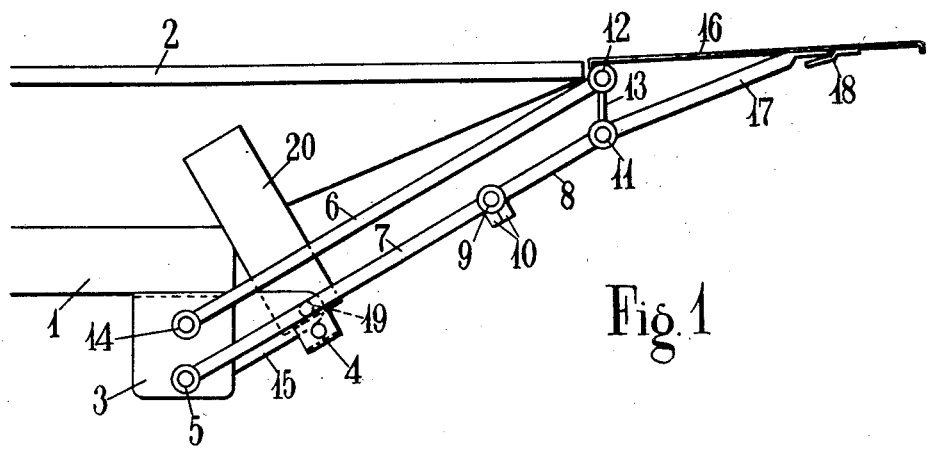
Inventor
C. O. Malmström United States Patent Office 2,774,494
Patented Dec. 18, 1956

2,774,494

LIFTING ARRANGEMENT FOR LOADING VEHICLES

Carl O. Malmström, Karlshamn, Sweden

Application September 27, 1954, Serial No. 458,656

Claims priority, application Sweden September 30, 1953

2 Claims. (Cl. 214—77)

The invention relates to a lifting arrangement, preferably adapted to be fitted to vehicles or the like in order that goods may more readily be loaded thereon or unloaded therefrom.

The lifting arrangement comprises a horizontal platform, the outer end of which is articulated to two pairs of equally long lifting arms which are superjacent and parallel with one another and the inward ends of which are swingably mounted on two shafts which are disposed opposite one another and which are fast with a fixed plate adapted to be secured to the chassis or the bottom of the platform body so that the lifting arms, fixed plate and platform form two parallel parallelograms, the platform being displaced translationally when the lifting arms are swung upwardly or downwardly through the agency of a lifting arrangement, for example a hydraulic cylinder fast with the fixed plate and acting upon one pair of lifting arms.

The invention is characterised in that that pair of lifting arms upon which the lifting arrangement acts is formed as two legs which are interconnected by a toggle joint and which have near the toggle joint stop shoulders which so limit the tendency of the legs to swing relatively to one another that the two pairs of lifting arms become equally long when the platform is raised clear of the ground, while, when the rearward ends of the lower pair of lifting arms rest upon the ground, the said lower pair becomes shorter and the said upper pair, with the result that the formerly horizontal platform now slants rearwardly with its rearward end resting upon the ground.

The invention will be explained with reference to the accompanying drawings, wherein:

Figure 1 illustrates one embodiment in the upper limit position, whilst

Figure 2 illustrates the same embodiment in its lower limit position.

In the following the embodiment illustrated will be described in detail with reference to the drawings and further details and features will become apparent.

Downwardly directed flanges 3 are secured rearwardly on either side of a chassis 1 associated with a lorry having a platform body 2. Fitted between the two parallel flanges 3 are two fixed transverse shafts 5, 14. Shaft 14 is fitted near the top of flange 3 and shaft 5 is fitted to the lower part thereof. Two parallel flat arms 15 are fixed between spacing sleeves to shafts 5, 14, the points of the arms 15 projecting rearwardly of the rearward edges of flanges 3. Two parallel lifting arms 6 are swingably mounted on shaft 14. Two other lifting arms 7, 8 of equal length to lifting arms 6 are swingably mounted on shaft 5 and are provided with a toggle joint 9 and with two shoulders 10 so that the said arms can be folded downwardly but not upwardly. Fast with the rearward ends of arms 6, 7, 8 are two parallel transverse shafts 11, 12 between which there are swingably mounted two guide arms 13 of such a length that the distance between shafts 11, 12 remains the same as the distance between shafts 5, 14. A platform 16 is swingably mounted on shaft 12 by means of a bearing sleeve fitted in the forward end of shaft 12. Swingably mounted on the lower shaft 11 are two cantilever arms 17 of equal length, the free end of which is adapted to engage in rearwardly directed hooks 18 fitted to the bottom of platform 16 and to raise the rearward part of platform 16. A lifting arrangement which can be, for example, a hydraulic cylinder 20 swingably suspended on two journals 19 and which is adapted to engage with a lifting shaft 4 disposed between the lifting arms 7 is secured between the rearward ends of the arms 15.

The arrangement operates in the following manner:

Before the lorry is driven, the lifting arms 7 are raised and retained in the raised position. The rearward end of the platform 16 is raised so that the hooks 18 disengage from the apexes of the cantilever arms 17, and the latter drop together with the platform 16 so as to hang vertically behind the rearward end of the platform body 2. If desired, the platform 16 can be so constructed as to be adapted to be brought up and used as a tailboard for the platform body 2. When the arrangement is to be used for loading, the apexes of the cantilever arms 17 are engaged below the hooks 18 and the lifting arms 7 are depressed. When the rearward ends of the lifting arms 7, 8 approach the ground, the toggle joint 9, by virtue of its own weight and the weight of the platform 16, possibly with the aid of a spring fitted, for example, in the hydraulic cylinder 20 or to shaft 5, drops down until the free rearward end of the platform 16 rests upon the ground. Relatively heavy gear can then be readily slid onto the platform. The lifting arms 7 then swing up, the toggle joint 9 straightening out until the shoulders 10 abut one another. This straightening of the toggle joint 9 causes the rearward end of the platform 16 to be lifted off the ground and to lie parallel therewith. As upward swinging of the lifting arms 7 continues, the platform 16 rises in a translational movement until reaching the same height as the platform body 2, whereupon the gear can be pushed on to the same. The sequence of operations is reversed for unloading. Thus, the heavy work of lifting is carried out entirely by the arrangement.

Although only one embodiment has been hereinbefore described and illustrated, a great number of different embodiments could be conceived without exceeding the scope of the invention. Thus, for example, the lifting arrangement could act instead upon the upper pair 6 of lifting arms, this pair then being provided with a toggle joint movement of which is so limited by stop shoulders that, when the platform 16 is maintained in the raised position, the two arms form a downwardly directed obtuse angle with one another, forming a straight line with one another when the platform 16 is resting upon the ground.

I claim:

1. An arrangement for lifting and lowering goods to and from a vehicle or the like comprising a lifting platform hinged at its inward end to the upper of two pairs of superposed arms of equal extended length, pivotally connected at one of their ends to the vehicle and pivotally interconnected at their other ends by a link, the lower of said pair of arms being formed in two parts connected by a knuckle permitting the parts of the arm to assume an upwardly directed obtuse angle when the outward ends of the arms rest on the ground and ensuring that the parts of the arm form a substantially straight line when the platform is raised, a cantilever arm mounted on the lower pivotal connection of the link for engagement with a stop on the platform to support the latter and lifting means such as an hydraulic cylinder and piston connected between the vehicle and the lower pair of said arms for raising and lowering said arms and thereby the platform.

2. An arrangement for lifting and lowering goods to and from a vehicle or the like comprising a lifting platform articulated at its inward end to two pairs of superposed arms of equal extended length pivotally mounted on the vehicle, an upper one of said arms being formed in two parts connected by a knuckle permitting the two parts of the said arm to form a downwardly directed obtuse angle when the platform is maintained in the raised position and to form a substantially straight line when the outward ends of the arm rest on the ground, a cantilever arm mounted on a pivotal connection at the outward end of one of said arms for engagement with a stop on the platform to support the latter and lifting means such as an hydraulic cylinder and piston connected between the vehicle and the knuckle jointed arms for raising and lowering said arms and thereby the platform.

References Cited in the file of this patent

UNITED STATES PATENTS

| | | |
|---|---|---|
| 2,391,813 | Wood | Dec. 25, 1945 |
| 2,626,067 | Berford et al. | Jan. 20, 1953 |
| 2,680,529 | Narvestad et al. | June 8, 1954 |
| 2,683,539 | Corley | July 13, 1954 |

FOREIGN PATENTS

| | | |
|---|---|---|
| 256,991 | Switzerland | May 4, 1946 |